United States Patent [19]

Gebhard et al.

[11] Patent Number: 5,623,085
[45] Date of Patent: Apr. 22, 1997

[54] METHOD FOR REDUCING MICROFOAM IN A SPRAY-APPLIED WATERBORNE COMPOSITION

[75] Inventors: Matthew S. Gebhard, New Britain; Linda S. Smith, Oreland; James C. Day, North Wales, all of Pa.

[73] Assignee: Rohm and Haas Company, Philadelphia, Pa.

[21] Appl. No.: 468,690

[22] Filed: Jun. 6, 1995

Related U.S. Application Data

[62] Division of Ser. No. 311,688, Sep. 23, 1994.

[51] Int. Cl.$^6$ ............................................. C07C 275/24
[52] U.S. Cl. .............................. 560/25; 560/26; 564/252; 252/182.2
[58] Field of Search ........................... 252/182.1, 182.22; 564/252; 560/25, 26

[56] References Cited

U.S. PATENT DOCUMENTS

| 4,076,945 | 2/1978 | Elmer | 560/25 |
|---|---|---|---|
| 5,047,588 | 9/1991 | Taylor | 564/252 |
| 5,270,380 | 12/1993 | Adamson et al. | 524/556 |
| 5,334,655 | 8/1994 | Carlson et al. | 524/804 |
| 5,486,576 | 1/1996 | Larson et al. | 525/375 |
| 5,504,241 | 4/1996 | Pohl et al. | 560/25 |

OTHER PUBLICATIONS

U.S. patent application Ser. No. 08/235,585 (Rohm and Haas Company), Filed Apr. 29, 1994.

*Primary Examiner*—Rachel Gorr
*Attorney, Agent, or Firm*—Ronald D. Bakule

[57] ABSTRACT

A method for reducing the amount of microfoam in a spray-applied clear waterborne composition is provided, the clear waterborne composition including an emulsion-polymerized addition polymer bearing at least one first reactive group and a reactive modifier bearing one second reactive group and a water-soluble group, the second reactive group being reactive with the first reactive group; applying the composition to a substrate using a spray method; and drying the composition. A reduced amount of microfoam improves the clarity of a film of the composition. Also provided are monofunctional carbodiimide reactive modifiers and substrates bearing the spray-applied clear compositions.

2 Claims, No Drawings

METHOD FOR REDUCING MICROFOAM IN A SPRAY-APPLIED WATERBORNE COMPOSITION

This is divisional of application Ser. No. 08/311,688, filed Sep. 23, 1994.

This invention relates to a method for reducing the amount of microfoam in a spray-applied clear waterborne composition.

Waterborne compositions are frequently applied to substrates by spraying techniques. Waterborne compositions containing an emulsion-polymerized addition polymer frequently contain microfoam after they are applied to substrates by various spraying techniques. Microfoam remaining in a dried film formed from the spray-applied aqueous composition detracts from the appearance of the film, particularly from the appearance of a clear film, which film may appear to be hazy.

U.S. Pat. No. 5,270,380 discloses a method for extending the open time of a brush-applied aqueous paint composition, wherein the coating composition contains a latex polymer and a reactive modifier.

The problem solved by the invention is reducing the amount of microfoam in a spray-applied clear waterborne composition.

STATEMENT OF THE INVENTION

A method for reducing the amount of microfoam in a spray-applied clear waterborne composition is provided: first, forming a clear waterborne composition including an emulsion-polymerized addition polymer, the polymer bearing at least one first reactive group, and a reactive modifier bearing one second reactive group and at least one water-soluble group, the second reactive group being reactive with the first reactive group, the ratio of the number of equivalents of the second reactive group to the number of equivalents of the first reactive group being from 0.01 to 0.3; applying the composition to a substrate using a spray method; and drying the composition.

DETAILED DESCRIPTION

A "waterborne composition" herein is defined as a composition containing an evaporable medium which is predominantly water but which may contain a water-miscible solvent which does not substantially enter into reactions with either the first or the second reactive groups of the waterborne composition such as, for example, isopropanol, ethylene glycol butyl ether, and propylene glycol propyl ether.

The emulsion-polymerized addition polymer in the clear waterborne composition may be prepared by the addition polymerization of at least one ethylenically unsaturated monomer such as, for example, acrylic ester monomers including methyl acrylate, ethyl acrylate, butyl acrylate, 2-ethylhexyl acrylate, decyl acrylate, methyl methacrylate, butyl methacrylate; styrene or substituted styrenes; butadiene; vinyl acetate or other vinyl esters; vinyl monomers such as vinyl chloride, vinylidene chloride, N-vinyl pyrollidone; and acrylonitrile or methacrylonitrile. Low levels of copolymerized ethytenically-unsaturated acid monomers such as, for example, 0.1%–8%, by weight based on the weight of the emulsion-polymerized polymer, acrylic acid, methacrylic acid, crotonic acid, itaconic acid, fumaric acid, maleic acid, monomethyl itaconate, monomethyl fumarate, monobutyl fumarate, maleic anhydride, 2-acrylamido-2-methyl-1-propanesulfonic acid, sodium vinyl sulfonate, and phosphoethyl methacrylate, may be used. At least one first reactive group such as, for example, hydroxyl group(s) and amino group(s) is incorporated into the emulsion-polymerized addition polymer by polymerizing first reactive group-functional monomers or precursors thereof; copolymerized ethylenically-unsaturated acid monomers may also function as the sole first reactive group(s). Preferred is 0.1% to 20% by weight. based on the weight of the emulsion-polymerized polymer of a copolymerized ethylenically-unsaturated first reactive group-bearing monomer.

The emulsion-polymerized polymer used in this invention is a substantially thermoplastic, or substantially uncrosslinked, polymer when it is applied to the substrate, although low levels of deliberate or adventitious crosslinking may be present. When low levels of precrosslinking or gel content are desired low levels of multi-ethylenically unsaturated monomers such as, for example, 0.1%–5%, by weight based on the weight of the emulsion-polymerized polymer, allyl methacrylate, diallyl phthalate, 1,4-butylene glycol dimethacrylate, 1,6-hexanedioldiacrylate, and divinyl benzene may be used. It is important, however, that the quality of film formation is not materially impaired.

The glass transition temperature of the emulsion-polymerized addition polymer is from −30 C. to 100 C., as measured by differential scanning calorimetry (DSC). Chain transfer agents such as, for example, mercaptans may be used in an amount effective to provide lower molecular weights.

The polymerization techniques used to prepare such emulsion-polymerized addition polymers are well known in the art. Conventional surfactants may be used such as, for example, anionic and/or nonionic emulsifiers such as, for example, alkali metal or ammonium alkyl sulfates, alkyl sulfonic acids, fatty acids, and oxyethylated alkyl phenols. The amount of surfactant used is usually 0.1% to 6% by weight, based on the weight of total monomer. Either thermal or redox initiation processes may be used. Conventional free radical initiators may be used such as, for example, hydrogen peroxide, t-butyl hydroperoxide, ammonium and/or alkali persulfates, typically at a level of 0.05% to 3.0% by weight, based on the weight of total monomer. Redox systems using the same initiators coupled with a suitable reductant such as, for example, isoascorbic acid and sodium bisulfite may be used at similar levels.

The average particle diameter of the emulsion-polymerized polymer particles is preferred to be from 30 nanometers to 500 nanometers.

In another aspect of the present invention the emulsion-polymerized addition polymer is prepared by a multistage emulsion addition polymerization process, in which at least two stages differing in composition are formed in sequential fashion. Such a process usually results in the formation of at least two mutually incompatible polymer compositions, thereby resulting in the formation of at least two phases. The mutual incompatibility of two polymer compositions and the resultant multiphase structure of the polymer particles may be determined in various ways known in the art. The use of scanning electron microscopy using staining techniques to emphasize the difference between the appearance of the phases, for example, is such a technique.

Polymeric particles formed by a multistage emulsion addition polymerization process are preferred. Such particles are composed of two or more phases of various geometries such as, for example, core/shell or core/sheath particles, core/shell particles with shell phases incompletely encapsulating the core, core/shell particles with a multiplicity of cores, and interpenetrating network particles. In all of these cases the majority of the surface area of the particle will be occupied by at least one outer phase and the interior of the particle will be occupied by at least one inner phase.

The two-staged emulsion-polymerized addition polymer particle may have an outer phase containing from 20% to 80%, by weight based on the total weight of the particle. Preferred is a two-staged emulsion-polymerized addition polymer particle with an outer phase having a glass transition temperature (Tg), as determined by DSC, which is at least 30 C. lower than the Tg of the inner phase. Preferred is a multi-staged emulsion-polymerized addition polymer with at least one first reactive group in the outer phase. Preferred is a multi-staged emulsion-polymerized addition polymer particle with a particle diameter from 30 nanometers to 500 nanometers.

Each of the stages of the multi-staged emulsion-polymerized polymer may contain the same monomers, chain transfer agents, etc. as disclosed herein-above for the emulsion-polymerized addition polymer. The emulsion polymerization techniques used to prepare such dispersions are well known in the art such as, for example, U.S. Pat. Nos. 4,325,856; 4,654,397; and 4,814,373.

In addition to the emulsion-polymerized addition polymer, the clear waterborne composition contains a reactive modifier bearing one second reactive group. The reactive modifier must also contain at least one water-soluble group sufficient to render the reactive modifier soluble in or dispersible in the waterborne composition. Suitable water-soluble groups include, for example, polyoxyethylene, polyvinyl alcohol, polyacrylamide, poly N-vinyl pyrrolidone, and starch. The reactive modifier bearing one second reactive group has a GPC weight average molecular weight from 200 to 50,000 and may be present as a solution or a dispersion, prior to reaction of the first and second reactive groups, in the waterborne composition.

The first reactive groups and the second reactive groups react to form ionic or covalent bonds before the waterborne composition is applied to a substrate.

Ionic binding includes acid-base interaction and ion pair binding of negatively and positively charged atoms as may result from reactive groups such as, for example. acid+amine and carboxylate+quaternary ammonium.

Covalent binding may result from reactive groups such as, for example, acetoacetate+aldehyde; acetoacetate+amine; amine+aldehyde; amine+anhydride; amine+isocyanate; amine+epoxy; aldehyde+hydrazide; acid+epoxy; acid+carbodiimide; acid+chloromethyl ester; acid+chloromethyl amide; acid+anhydride; acid+aziridine; epoxy+mercaptan; ketone+hydrazide; and isocyanate+alcohol. The first or second reactive group in each pair may be present in the latex polymer or in the reactive modifier.

A preferred reactive modifier is an amphiphilic compound having ionizable or acid-base reactive groups. Amphiphilic compounds have both hydrophobic and hydrophilic groups. The hydrophobic portion of the amphiphilic compound is water-insoluble and must contain at least 4 carbon atoms; it may be branched, straight chain, aromatic, saturated or unsaturated. The hydrophilic portion of the amphiphilic compound is water soluble such as, for example, polyoxyethylene, polyoxypropylene, polysaccharide, hydroxyethyl cellulose, polyvinyl pyrrolidone, polyacrylamide, and polyvinyl alcohol.

A preferred amphiphilic compound is a quaternary ammonium salt, such as for example, a quaternary salt—Ethoquad® 0/25 supplied by Akzo Chemicals Inc. This salt is a quaternary polyethoxylated ammonium salt with the formula  where x+y=15 and a molecular weight of about 942. The quaternary salt contains a positively charged nitrogen group which is reactive with an emulsion polymer containing an anionic group such as, for example, a carboxylate group.

A polyethoxylated amine which is another preferred amphiphilic compound is Triton® RW-150 supplied by Union Carbide Company with the formula t-$C_{12-14}$NH$(CH_2CH_2O)_{15}$H. A preferred amphiphilic compound is a tertiary polyethoxylated amine with the formula $$C_{18}H_{37}N(CH_2CH_2O)_xH(CH_2CH_2O)_yH(x+y=15)$$

and a molecular weight of about 929 (Ethomeen® 18/25 supplied by Akzo Chemical Inc.). The amine base is the second reactive group which is combined and reacted with a emulsion polymer containing an acid as the first reactive group.

A preferred covalently bonded embodiment is a monoamine such as, for example, JEFFAMINE® M-2070 (supplied by Texaco Chemical Company) reactive modifier reacted with an acetoacetate-containing emulsion polymer. JEFFAMINE® M-2070 is a polyether monoamine based on a predominantly polyethylene oxide backbone.

In another aspect of the invention a mono-functional carbodiimide reactive modifier is reacted with a carboxylic acid-containing emulsion polymer. The mono-functional carbodiimide has the formula

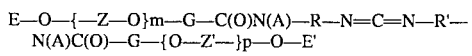

wherein m is an integer of from 1 to 1150; p is an integer of from 1 to 1150; A is independently selected from hydrogen or C1–C6 alkyl; E and E' are hydrogen or a C1–10 alkyl group and may be the same or different; G is a bond, g'—N(g)— or g'—O— wherein g is selected from hydrogen and an alkyl group and g' is selected from a bond and C1–C6 alkyl; R and R' are independently selected from alkylene, arylene, substituted arylene, biarylene alkylene and substituted biarylene alkylene; and Z and Z' are a C1–6 alkyl group, and may be the same or different.

Preferred is the carbodiimide of the formula herein-above wherein A is hydrogen; E and E' are methyl; R and R' are phenylene; and Z and Z' are ethyl, propyl, or mixtures thereof.

The mono-functional carbodiimide is prepared by reacting a monohydroxy- or amino-terminated hydrophilic molecule with a molecular weight of 200 to 50,000 in a first step with a diisocyanate in a stoichiometric ratio, i.e., 2 isocyanate groups/1 hydroxyl or amino group. Preferred is the first step reaction of a hydroxy-functional hydrophilic molecule with a molecular weight of 200 to 50,000 with a diisocyanate. The hydrophilic molecule may be predominantly composed of, for example, an alkylene oxide such as, for example, ethylene oxide, propylene oxide, and mixtures thereof; or polyacrylamide. Preferred as the hydrophilic molecule is a monohydroxy-terminated polyether such as, for example, PEG 750 methyl ether (supplied by Aldrich). The diisocyanate may be an aromatic or aliphatic diisocyanate; preferred is tolylene 2,4-diisocyanate. In a second step the reaction product of the first step is condensed using a catalyst such as, for example, 3-methyl-1-phenyl-2-phospholene-1-oxide cataylst in xylene (0.7 mole % on diisocyanate) and heat to form a monocarbodiimide.

There are several ways to combine the emulsion polymer and the reactive modifier in the waterborne composition. The first reactive group and the second reactive group are selected so that they substantially completely react under the conditions prevailing during the forming of the waterborne composition. It is preferred that the reactive modifier is added to the emulsion polymer and stirred until blended with the emulsion polymer, such as for example, on the order of at least 10 minutes. After stirring, the emulsion polymer and reactive modifier may be left to equilibrate and react for a time, such as, for example, overnight. Then other ingredients may be admixed with the mixture of the reactive modifier and the emulsion polymer.

The reactive modifier containing the second reactive group is added to the emulsion polymer at a ratio of the equivalents of the second reactive group to the equivalents of the first reactive group of from 0.01 to 0.3. Preferably, the reactive modifier is added to the emulsion polymer at a ratio of the equivalents of the second reactive group to the equivalents of the first reactive group of from 0.05 to 0.15.

The solids content of the clear waterborne composition may be 20% to 70% by weight. The viscosity of the waterborne composition may be from 50 centipoises to 10,000 centipoises, as measured using a Brookfield viscometer (Model LVT using spindle #3 at 12 rpm); the viscosities appropriate for different spraying methods vary considerably.

The clear waterborne composition contains no ingredients which cause substantial opacity in a dried coating at the desired dry film thickness, which is typically from 0.1 mil to 5 mils. The dried coating may be applied as one coat or as multiple coats, with or without drying between coats. The waterborne composition may contain, in addition to the emulsion-polymerized addition polymer and the reactive modifier, conventional components such as, for example, emulsifiers, substantially transparent pigments and fillers, dispersants, coalescing agents, flatting agents, curing agents, thickeners, humectants, wetting agents, biocides, plasticizers, antifoaming agents, colorants, waxes, and anti-oxidants, The spray-applied clear waterborne composition is applied to a substrate such as, for example, metal, wood, and plastic, using a spraying method. Preferred substrates are wood and automotive substrates. The composition may be applied to wood such as, for example, wood, sealed wood, particle board treated with a UV-cured filler, painted wood, and previously coated wood; or to metal such as, for example, metal, treated metal, metal coated with an electodeposited primer, and previously painted metal; or to plastic such as, for example, plastic, plastic alloys,. and reinforced plastic (such as RIM substrate). The spraying method may be, for example, air-assisted spray, airless spray, bell or disc spraying, high volume/low pressure spray, and air-assisted electrostatic spray. In such spraying methods the waterborne polymeric composition is atomized, or formed into small droplets, which are conveyed to the substrate where the droplets form into a substantially continuous film. In such spray-applied methods the atomized droplets of the waterborne polymeric composition are formed in contact with and/or admixed with a gas such as, for example, air. The gas, under pressure, may be required to atomize the coating such as, for example, in conventional air spray applications; the gas may flow towards the substrate and provide for at least some of the conveying of the atomized composition such as, for example, in air-assisted airless spray application; or the gas may be the medium through which the atomized composition, atomized by mechanical action in the presence of the gas such as, for example, in airless spray, disc, and bell applications, with or without electrostatic assistance, moves to the substrate. Occlusions of gas, "microfoam", typically are found in a waterborne composition after its application to the substrate. The microfoam is undesirable; microfoam may cause haze or opacity in clear or substantially unpigmented coatings or films.

The clear waterborne composition may be dried at ambient temperature or at elevated temperatures. "Microfoam" herein is defined as substantially spherical gas-filled occlusions in the dried film which are typically 10–20 micrometers in radius. The microfoam occlusions lack sufficient buoyancy to escape from the waterborne composition before they become substantially immobilized in the applied composition. The "amount of microfoam" as used herein is determined by counting the number of bubbles in a selected area of the applied waterborne composition, using an optical microscope under 70× magnification. The absolute amount of microfoam is influenced by spray equipment, spray conditions, and environmental conditions such as, for example, temperature, humidity, and air flow. The method for reducing microfoam of this invention relates to the reduction of the amount of microfoam observed in a spray-applied clear composition relative to the amount of microfoam observed in a comparative sample, both prepared under the same conditions.

The following examples illustrate the method for reducing the amount of microfoam in a spray-applied waterborne composition.

EXAMPLE 1

Preparation and evaluation of clear waterborne compositions containing an emulsion-polymerized addition polymer bearing at least two carboxylic acid first reactive groups and a reactive modifier bearing one amine second reactive group.

Preparation of Sample 1. A 4-neck, 5-liter, round-bottom stirred reaction flask containing 1085 g DI water and 0.93 g of a 58% alkylphenoxypolyethyleneoxy sulfate surfactant was heated to 85° C. To the kettle, 3 g sodium carbonate dissolved in 75 g DI water and 4 g ammonium persulfate dissolved in 20 g DI water were added in order. The batch temperature was adjusted to 85° C. after which a gradual addition of Stage #1 ME was initiated at a uniform rate and fed to completion to the kettle over 112 minutes. Simultaneously, the Cofeed Initiator was started at a rate of 5.7 g/10 minutes. The batch temperature was maintained at 85°±2° C. over the stage 1 feed period. On completion of the addition of Feed #1, the Cofeed Initiator feed was interrupted and the batch was held at 85°±2° C. for 30 minutes. After the hold period, the addition of the Stage #2 ME was started and the Cofeed Initiator addition was resumed. The Stage #2 ME was fed to the kettle over 68 minutes while maintaining a batch temperature of 85°±2° C. When all feeds were complete, the batch was held at temperature for 30 minutes. The reaction was then cooled to 65° C. Two redox chasers were added. The batch was neutralized with ammonia and a biocide was added.

The Stage #1 ME consisted of an emulsion of 272.9 g DI water, 12.6 g of a 58% active solution of an alkylphenoxypolyethyleneoxy sulfate surfactant, 640.7 g butyl acrylate, 275.9 g methyl methacrylate, and 38.2 g methacrylic acid. The Stage #2 ME consisted of an emulsion of 272.9 g DI water, 7.7 g of an alkylphenoxypolyethyleneoxy sulfate surfactant (58% active solution), 62.6 g butyl acrylate, 510.9 g methylmethacrylate, and 11.7 g methacrylic acid. The Cofeed Initiator was composed of 2 g ammonium persulfate dissolved in 100 g DI water.

Forming Waterborne compositions 1-3 (WC1-WC3) and Comparative Compositions A-B

Ethomeen™ 18/25 was diluted to 33% by weight in water. Ethomeen™ 18/25 (33%) was added to carboxylic acid-containing Sample 1 at levels of 2%, 4%, 8%, and 16% Ethomeen™ 18/25 by weight on latex polymer solids. After 24 hours the samples were adjusted to pH 8.0 with 7% NH$_4$OH, and 20% based on latex polymer solids of a 3/1 Butyl Cellosolve™/Butyl Carbitol™ mix was added (Table I), along with 0.25% by solids, based on solids of rheology modifier Acrysol™ RM-825 solids. After equilibrating for a day, the viscosity was adjusted to 20 seconds on a #2 Zahn cup by addition of water.

TABLE 1-1

Waterborne Compositions (WC1-WC3) and Comparative Compositions A-B

| Comp. A | WC1 | WC2 |
|---|---|---|
| 75 g Sample 1 (44%) | 75 g Sample 1 (44%) | 75 g Sample 1 (44%) |
| +1.65 Butyl Carbitol™ | +2 g Ethomeen ™ 18/25 (33%) | +4 g Ethomeen ™ 18/25 (33%) |
| +4.95 Butyl Cellosolve ™ | +1.65 Butyl Carbitol ™ | +1.65 Butyl Carbitol ™ |
| +30.7 g water | +4.95 Butyl Cellosolve ™ | +4.95 Butyl Cellosolve ™ |
| +0.33 g Acrysol ™ RM-825 | +30.9 g water | +25.4 g water |
| +7% NH$_4$OH to pH 8.0 | +0.33 g Acrysol ™ RM-825 | +0.33 g Acrysol ™ RM-825 |
| | +7% NH$_4$OH to pH 8.0 | +7% NH$_4$OH to pH 8.0 |

| WC3 | Comp. B |
|---|---|
| 75 g Sample 1 (44%) | 75 g Sample 1 (44%) |
| +8 g Ethomeen ™ 18/25 (33%) | +16 g Ethomeen ™18/25 (33%) |
| +1.65 Butyl Carbitol ™ | +1.65 Butyl Carbitol ™ |
| +4.95 Butyl Cellosolve ™ | +4.95 Butyl Cellosolve ™ |
| +16.7 g water | +10.7 g water |
| +0.33 g Acrysol ™ RM-825 | +0.33 g Acrysol ™ RM-825 |
| +7% NH$_4$OH to pH 8.0 | +7% NH$_4$OH to pH 8.0 |

Spraying waterborne compositions 1-3 (WC1-WC3) and comparative compositions A-B and Evaluation of Microfoam. Microfoam was evaluated by spraying one coat of each of the compositions over black glass. The coats were applied using a conventional suction-feed spray gun (DeVilhiss MBC) with an EX tip and a #30. The air pressure was 45 psi. The panels were sprayed and dried at 90° F./20% RH. The bubble density was evaluated using a 70× microscope and counting the number of bubbles per square mm in the dried film. The results are given below in Table 1-2.

TABLE 1-2

Evaluation of Microfoam for Sprayed Compositions WC1-WC3 and Comparative Compositions A-B

| Composition | Solids | Viscosity | MF[1] |
|---|---|---|---|
| Comp. A | 29.5 | 20' | 5.5 |
| WC1 | 29.4 | 17' | 3.75 |
| WC2 | 31 | 17' | 0.7 |
| WC3 | 33.6 | 19' | 3.75 |
| Comp. B | 35.4 | 19' | 15.75 |

[1]Microfoam density in bubbles per square mm

Ethomeen™ is a registered trademark of Akzo Chemicals Incorporated Butyl Cellosolve™ and Butyl Carbitol™ are registered trademarks of Union Carbide Acrysol™ is a registered trademark of the Rohm and Haas Company Dried sprayed waterborne compositions of this invention WC1-WC3 show reduced microfoam levels relative to composition Comp. A, absent the reactive modifier, not of this invention, and Comp. B, not of this invention.

EXAMPLE 2

Preparation and evaluation of clear waterborne compositions containing an emulsion-polymerized addition polymer bearing at least one carboxylic acid first reactive group and a reactive modifier bearing one carbodiimide second reactive group.

Preparation of monofunctional aromatic carbodiimide (MCDI 1). A mixture of 80% tolylene 2,4-diisocyanate and 20% tolylene 2,6-diisocyanate (48.2 g, 0.28 moles) was treated with poly(ethylene glycol) monomethyl ether PEG 750 (supplied by Aldrich) (207.8 g, 0.28 moles, mole ratio diisocyanate/Carbowax® 750=1/1) in a 1 liter round bottomed flask equiped with a thermometer, magnetic stirrer, and condenser. Amyl acetate (250 g.) was added and the mixture heated to 75° C. for 1 hour to complete the alcohol-isocyanate reaction. The mixture was then treated with 2.33 g of a 16% wt solution of 3-methyl-1-phenyl-2-phospholene-1-oxide cataylst in xylene (0.7 mole % on diisocyanate). The mixture was held for 9 hours at 100 C. and then at 120 C. for 14 hours. The progress of the reaction was followed by measuring the weight loss due to carbon dioxide evolution and by measuring the relative intensities of the IR bands at 2130 and 2270 cm.$^{-1}$ for carbodiimide and isocyanate, respectively. Heating was discontinued when the theoretical weight loss (6.1 g.) was attained. The material was cooled and transferred to a sealed container. The product monofunctional carbodiimide (MCDI 1) contained 50% solids insolvent.

FIG. 2.1 Composition of MCDI 1.

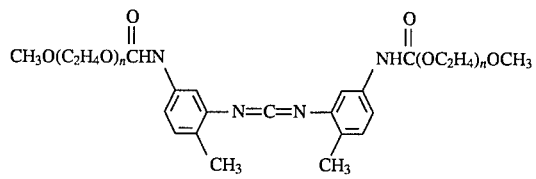

MCDI 1 Average n = 16.3

Forming Waterborne composition 4 (WC4) and comparative composition C

4% MCDI 1 solids on solids was added to Sample 1. After 24 hours the samples were adjusted to pH 8.0 with 7% NH$_4$OH, and 20% based on latex polymer solids of a 3/1 Butyl Cellosolve™/Butyl Carbitol™ mix was added, along with 0.25% Acrysol™ RM-825 solids (Table 2.2). After equilibrating for a day, the viscosity was adjusted to viscosity of 20 seconds on a #2 Zahn cup by addition of water.

TABLE 2.2

Waterborne Composition (WC4) and Comparative Composition C

| Comp. C | Composition WC4 |
|---|---|
| 75 g Sample 1 | 75 g Sample 1 |
| +1.65 Butyl Carbitol ™ | +2.64 g MCDI 1 (50% Amyl Acetate) |
| +4.95 Butyl Cellosolve ™ | +1.65 Butyl Carbitol ™ |
| +30.7 g water | +4.95 Butyl Cellosolve ™ |
| +0.33 g Acrysol RM-825 | +30 g water |
| +7% NH$_4$OH to pH 8.0 | +0.33 g Acrysol RM-825 |
| | +7% NH$_4$OH to pH 8.0 |

Spraying waterborne composition 4 (WC4) and comparative composition C and Evaluation of Microfoam. Microfoam was evaluated by spraying one coat of each of the compositions over black glass. The coats were applied using a conventional suction-feed spray gun (DeVilhiss MBC) with an EX tip and a #30. The air pressure was 45 psi. The panels were sprayed and dried at 90° F./20% RH. The bubble density was evaluated using a 70× microscope and counting the number of bubbles per square mm in the final dried film. The results are given below in Table 2-3.

TABLE 2-3

Evaluation of Microfoam for Sprayed Composition WC4 and Comparative Composition C

| Composition | Solids | Viscosity | MF[1] |
|---|---|---|---|
| Comp. C | 29.5 | 20' | 5.5 |
| WC4 | 30.1 | 22' | 0.9 |

[1]Microfoam density in bubbles per square mm

The dried sprayed waterborne composition of this invention WC4 exhibited a lower level of microfoam than did Comp. C, absent the reactive modifier, not of this invention.

EXAMPLE 3

Preparation and evaluation of clear waterborne compositions containing an emulsion-polymerized addition polymer bearing at least one carboxylic acid first reactive group and a reactive modifier bearing one carbodiimide second reactive group.

Preparation of monofunctional aromatic carbodiimide (MCDI 2). A mixture of 80% tolylene 2,4-diisocyanate and 20% tolylene 2,6-diisocyanate (86.7 g, 0.50 moles) was treated with poly(ethylene glycol) monomethyl ether PEG 350 (supplied by Aldrich) (174.5 g, 0.50 moles, mole ratio diisocyanate/Carbowax® 350=1/1)in a 1 liter round bottomed flask equiped with a thermometer, magnetic stirrer, and a water-cooled condenser. The mixture was stirred and heated at 75° C. for 1 hour to complete the alcohol-isocyanate reaction. The mixture was then cooled and 250 g. of amyl acetate was added, followed by 4.23 g of a 16% wt solution of 3-methyl-1-phenyl-2-phospholene-1-oxide cataylst in xylene (0.7 mole % on diisocyanate). The mixture was stirred and heated to 60 C. for 5 hours and then to 80 C. for 25.5 hours, and finally to 100 C. for 2 hours. The progress of the reaction was followed by measuring the weight loss due to carbon dioxide evolution and by measuring the relative intensities of the IR bands at 2130 and 2270 cm.$^{-1}$ for carbodiimide and isocyanate, respectively. Heating was discontinued when the theoretical weight loss (11.1 g.) was attained. The material was cooled and transferred to a sealed container. The product monofunctional carbodiimide (MCDI 2) contained 50% solids insolvent.

FIG. 3.1 Composition of MCDI 2.

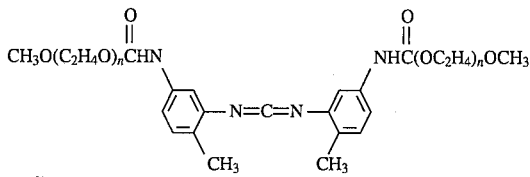

MCDI 2 Average n = 7.3

Forming Waterborne compositions 5–6 (WC5–WC6) and comparative composition D

The addition and formulation procedure for each composition was as follows. 5% MCDI 1 or 5% MCDI 2, solids on solids, was added to Sample 1. After 24 hours the samples were adjusted to pH 8.0 with 7% NH$_4$OH, and 20% based on latex polymer solids of a 3/1 Butyl Cellosolve™/Butyl Carbitol™ mix was added (Table 3.2). After equilibrating for a day, the viscosity was adjusted to viscosity of 20 seconds on a #2 Zahn cup by addition of water.

TABLE 3-2

Waterborne compositions WC5–WC6 and comparative composition D

| Comp. D | Composition WC5 |
|---|---|
| 100 g Sample 1 | 100 g Sample 1 |
| +2.2 Butyl Carbitol ™ | +2.64 g MCDI 2 (50% Amyl Acetate) |
| +6.6 Butyl Cellosolve ™ | +2.2 Butyl Carbitol ™ |
| +22.6 g water | +6.6 Butyl Cellosolve ™ |
| +7% NH$_4$OH to pH 8.0 | +12.6 g water |
| | +7% NH$_4$OH to pH 8.0 |

| Composition WC6 |
|---|
| 100 g Sample 1 |
| +2.64 g MCDI 1 (50% Amyl Acetate) |
| +2.2 Butyl Carbitol ™ |
| +6.6 Butyl Cellosolve ™ |
| +12.6 g water |
| +7% NH$_4$OH to pH 8.0 |

Spraying waterborne compositions 5–6 (WC5–WC6) and comparative composition D and Evaluation of Microfoam. Spray properties were evaluated by spraying one coat of each of the compositions over black glass. The coats were applied using a conventional suction-feed spray gun (DeVilbiss MBC) with an EX tip and a #30. The gas pressure was 45 psi. The panels were sprayed and dried at 102° F./20% RH. The bubble density was evaluated using a 70× microscope and counting the number of bubbles per square mm in the final dried film. The results are given below in Table 3-3.

TABLE 3-3

| Composition | MF[1] |
|---|---|
| Comp. D | 43.5 |
| WC5 | 4.1 |
| WC6 | 1 |

[1] Microfoam density in bubbles per square mm

The dried sprayed waterborne compositions of this invention WC5–WC6 exhibited a lower level of microfoam than did Comp. D, absent the reactive modifier, not of this invention.

What is claimed is:

1. A mono-functional carbodiimide having the formula

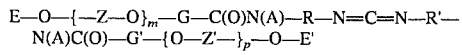

E—O—{—Z—O}$_m$—G—C(O)N(A)—R—N=C=N—R'—N(A)C(O)—G'—{O—Z'—}$_p$—O—E' wherein m is an integer of from 1 to 1150; p is an integer of from 1 to 1150; A is independently selected from hydrogen or $C_1$–$C_6$ alkyl; E and E' are hydrogen or a $C_1$–$C_{10}$ alkyl group and may be the same or different; G is a bond, —g'—N(g)— or —g'—O— and G' is a bond, —N(g)—g'—, or —O—g'—, wherein g is selected from hydrogen or an alkyl group and g' is selected from $C_1$–$C_6$ alkylene; R and R' are independently selected from alkylene, arylene, substituted arylene, biarylene alkylene or substituted biarylene alkylene; and Z and Z' are a $C_1$–$C_6$ alkylene group, and may be the same or different.

2. The carbodiimide of claim 1 wherein A is hydrogen; E and E' are methyl; R and R' are tolylene; and Z and Z' are selected from the group consisting of ethylene, propylene, and mixtures thereof.

* * * * *